United States Patent [19]
Sugiura et al.

[11] 3,821,172
[45] June 28, 1974

[54] FIBER TREATING AGENTS

[75] Inventors: Takahisa Sugiura, Takatsuki; Nobuyasu Arai, Toyonaka; Takashi Kato, Amagasaki; Hiroshi Hotta, Kyoto, all of Japan

[73] Assignee: Sumitomo Chemical Company, Limited, Osaka, Japan

[22] Filed: Feb. 5, 1973

[21] Appl. No.: 329,432

[30] Foreign Application Priority Data
Feb. 5, 1972  Japan.............................. 47-12978
Apr. 28, 1972  Japan............................ 47-43127

[52] U.S. Cl.... 260/78.5 R, 8/115.5, 117/138.8 UA, 117/138.8 N, 117/138.8 R, 117/138.8 D, 117/138.8 A, 117/140 A, 117/161 UZ, 117/161 UT, 260/73 R, 260/80 P, 260/80.72, 260/80.73, 260/80.8, 260/80.81, 260/86.1 R, 260/86.1 N, 260/86.1 E, 260/897 R, 260/897 B

[51] Int. Cl......................... C08f 15/00, C08f 15/40
[58] Field of Search......... 260/78 UA, 78.5 R, 80 P, 260/80.72, 80.73, 80.81, 86.1 N, 86.1 E, 86.1 R, 80.8, 897 R, 897 B, 73 R; 117/161, 138.8 UA, 140 A, 138.8 N, 138.8 R, 138.8 D, 138.8 A; 8/115.5

[56] References Cited
UNITED STATES PATENTS

| | | | |
|---|---|---|---|
| 3,152,919 | 10/1964 | Biles et al. ....................... | 117/138.5 |
| 3,310,428 | 3/1967 | Maloney ............................ | 117/118 |
| 3,415,904 | 12/1968 | Taniguchi et al. .................. | 260/897 |
| 3,431,132 | 3/1969 | Bacon et al. ............................. | 117/7 |
| 3,642,732 | 2/1972 | Yasumura et al. ................ | 260/80.81 |
| 3,698,856 | 10/1972 | Pittman et al. ...................... | 8/115.5 |
| 3,720,651 | 3/1973 | Imoto et al. ..................... | 260/78.5 R |

*Primary Examiner*—Joseph L. Schofer
*Assistant Examiner*—John Knight
*Attorney, Agent, or Firm*—Stevens, Davis, Miller & Mosher

[57] ABSTRACT

Fiber treating agents containing copolymers of isobutylene or/and propylene, acrylic esters and optionally functional vinyl compounds, which impart to fibers desirable properties such as anti-pilling, hand-improving, water-proof and repellent, shrink- and crease-proof, dimension-stabilizing properties, and are useful as binders.

9 Claims, No Drawings

FIBER TREATING AGENTS

The present invention relates to fiber treating agents, and more particularly to fiber treating agents containing copolymers which are prepared from isobutylene or/and propylene, acrylic esters and optionally functional vinyl compounds, and methods for treating fibers with said fiber treating agents.

It is at present common that synthetic or natural fibers are treated in many ways in order to overcome the inherent defects thereof and further display excellent properties thereof. For example, they are treated with various fiber treating agents such as anti-pilling, hand-improving, water-proof and -repellent, shrink- and crease-proof, dimension-stabilizing agents and binders.

Examples of fiber treating agents employed now are condensed copolymers such as phenol resins, urea resins, melamine resins, glyoxal resins, polyurethane resins, and nylon resins, and vinyl polymers such as acrylic resins, polyvinylacetate resins and synthetic rubbers. The properties of these resins, however, are not always satisfactory. Generally speaking, condensed copolymers have a high cohesion energy density and so a high affinity to various fibers, resulting in a high resin finishing effect, however they cannot be considered desirable as they are hard and so deteriorate the hand of fibers. Although vinylpolymers are now commonly used as treating agents which do not deteriorate the inherent hand of fibers, they are not either always satisfactory. For example, synthetic rubbers have a low cohesion energy density and so a low affinity to fibers having polarity, and furthermore have a poor durability to hydrocarbon or halogenated hydrocarbon solvents. Similarly, acrylic ester resins and polyvinylacetate resins have also poor resistance to alkalis, water and washings.

The inventors have found, after the extensive studies on the development of the new resin finishing agents for fibers, that copolymers prepared from acrylic esters and olefins selected from the group consisting of isobutylene and propylene have excellent properties as fiber treating agents. Through this type of copolymerization with olefins, the polarity of polymers containing acrylic esters is reduced, resulting in increase of the resistance of the copolymers to alkalis and water, and in addition, the copolymers, when used as a resin finishing agent, impart a rather good hand touch and also impart a water-repellent effect to some extent which has never been observed with conventional acrylic resins and polyvinylacetate resins. Furthermore, the inventors have found that multi-component interpolymers which are prepared by incorporating compounds containing a functional group into these olefinacrylic ester copolymers have an extremely excellent effect as a reactive resin finishing agent.

The present invention is to provide fiber treating agents containing copolymers of about 30 to 50 percent by mole of at least one member selected from the group consisting of isobutylene and propylene (A component), about 20 to 70 percent by mole of at least one acrylic ester (B component) in which the alcohol moiety is a hydrocarbon or halogenated hydrocarbon residue having one to 20 carbon atoms, and about 0 to 30 percent by mole of at least one functional vinyl compound (C component) having three to 40 carbon atoms, and to provide a method for treating fibers, characterized in that the fibers are treated with at least one copolymer of said A, B and C components.

In general, a radical polymerization of olefins does not substantially proceed because of the degradative chain transfer reaction thereof and so it was difficult to obtain a high molecular weight copolymer in a high yield also in the copolymerization reaction of olefins with acrylic esters. The inventors, however, succeeded in copolymerizing acrylic esters with propylene or/and isobutylene in a high yield, and obtaining a high molecular weight copolymer containing olefin units in a large proportion, for example, 30 to 50 percent by mole of isobutylene or/and propylene. The content of the acrylic ester units in the copolymers of the invention is 20 to 70 percent by mole, and preferably 50 to 70 percent by mole when the content of functional vinyl compound is nought.

Among the copolymers employed in the present invention, the important ones contain about 50 percent by mole of propylene and/or isobutylene unit, and the especially important ones are alternating copolymers in which a propylene or/and isobutylene unit and an acrylic ester unit are alternately combined with each other and the proportions of the units are each about 50 percent by mole. In the case of multi-component interpolymers of the invention which are prepared from a functional vinyl compound and the two components mentioned above, the vinyl compound reacts similarly as an olefin (e.g. isobutylene or propylene) if it is a monomer belonging to the A group mentioned in British Pat. No. 1,187,105, or it reacts similarly as an acrylic ester if it is a monomer belonging to the B group mentioned therein, and thus A group monomers and B group monomers form an alternating copolymer consisting of 50 percent by mole of each group monomers. Copolymers preferably employed in the present invention have a high molecular weight and 0.05 to 10, preferably 0.1 to 3 dl/g of an intrinsic viscosity measured in the benzene solution at 30°C. and, if necessary, those of less than 0.05 dl/g may also be employed.

The alcohol moiety of ester group in the acrylic ester unit constructing copolymers of the invention is not particularly limited, however, is preferably a hydrocarbon- or halohydrocarbon-residue having one to 20 carbon atoms. Straight or branched alkyl residues having four to 18 carbon atoms are particularly preferable in order to obtain a coating of soft hand. These compounds are exemplified as follows: methyl acrylate, ethyl acrylate, n-butyl acrylate, n-octyl acrylate, 2-ethylhexyl acrylate, lauryl acrylate, stearyl acrylate, 2-chloroethyl acrylate, cyclohexyl acrylate or mixtures thereof.

The typical examples of functional vinyl compounds employed in the invention are vinyl compounds having three to 40 carbon atoms which have an acid halide, amide, carboxyl, acid anhydride, nitrogen-containing heterocyclic, nitrile or aldehyde group. Particularly preferably, vinyl compounds of the following general formula are employed:

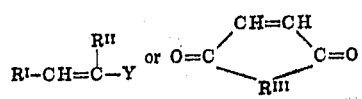

(wherein Y is a residue having a functional group selected from the group consisting of acid halide, amide, carboxyl, acid anhydride, nitrogen-containing heterocyclic, nitrile and aldehyde, and having one to 20 carbon atoms; $R^I$ and $R^{II}$ are each a hydrogen or halogen atom, a hydrocarbon- or halohydrocarbon-residue having 1 to 8 carbon atoms or residue selected from Y; and $R^{III}$ is an oxygen atom or $<N-R^{IV}$ residue wherein $R^{IV}$ is a hydrogen atom or a hydrocarbon- or halohydrocarbon-residue having one to eight carbon atoms.) Hydrocarbon- or halohydrocarbon-residues are preferably an alkyl, alkenyl, aryl, alkylaryl, aralkyl, cycloalkyl and halogenated derivatives thereof. In the vinyl compounds are included preferably acrylic acid, acryloyl halides, acrylamides, maleic anhydride, maleimides, fumaric acid, acrylonitrile, vinylpyridines, acroleins and derivatives thereof.

Examples of the monomers employed alone or in combination are more concretely shown as follows: acrylic acid, methacrylic acid, crotonic acid, itaconic acid, acryloyl chloride, acryloyl bromide, acryloyl iodide, methacryloyl chloride, methacryloyl bromide, acrylamide, N-methylacrylamide, N,N-diethylacrylamide, methacrylamide, N,N-dimethylaminoethyl acrylate, maleic anhydride, maleimide, N-methylmaleimide, maleic acid monoamide, N-methylmaleic acid monoamide, maleic acid diamide, $N,N^1$-dimethylmaleic acid diamide, fumaric acid, fumaric acid monoamide, maleic acid, acrylonitrile, methacrylonitrile, maleodinitrile, fumarodinitrile, N-vinylpyridine, 2-vinylpyridine, 2-methyl-N-vinylpyridine, acrolein, methacrolein and crotonaldehyde.

Most fibers have their own functional groups, for example, nylon or wool has a free amino radical which can react with copolymers containing, e.g. acid halide or acid anhydride radicals and form a surface film having a permanent chemical binding which thus results in a resin finishing of excellent durability.

Particularly important copolymers of the present invention are copolymers containing acryloyl halides or/and maleic anhydride as the C component.

The use of copolymers having incorporated therein acid chloride radical as a fiber treating agent has already been disclosed in U.S. Pat. No. 3,310,428. At that time, however, a direct copolymerization process of acryloyl halides had not been successful, and a copolymerization of the halides with isobutylene or propylene had also been considered impossible. Copolymers most similar to copolymers of the invention in the well known art are ones consisting of ethylene and methacryloyl chloride, which are obtained by converting a carboxylic radical of copolymers prepared from methacrylic acid and ethylene into an acid chloride radical. These copolymers, however, are not desirable as a fiber treating agent, as they tend disadvantageously to cause gelation in the presence of a free acid and impart a stiff hand because of a large proportion of ethylene. And these well known copolymers need sufficient heat-curing, however the olefin-acrylic ester-acryloyl chloride copolymers of the invention are found to be curable even at room temperature.

Acryloyl halides particularly useful in the invention include acryloyl chloride, iodide, bromide and fluoride, and acryloyl chloride is particularly preferable. Functional vinyl compounds employed in the invention are incorporated into copolymers by 0 to 30 percent by mole, preferably 0.1 to 30 percent by mole.

In order to prepare the novel copolymers employed in the invention, it is advantageous that Lewis acid, e.g., metal halides, which are able to form complexes with acrylic esters through the carbonyl radical thereof, is added to a polymerization reaction system to surpress the degradative chain transfer reaction of olefins. As this type of Lewis acids, any of compounds which can form complexes through lone pair electrons of a carbonyl radical may optionally be employed. For example, halides of Group $II_b$ to $V_b$ elements and Group VIII elements of the Mendeleev Periodic Table, especially halides of aluminum and boron are preferably employed. The complexed copolymerization reactions in the presence of these halides are initiated and proceed effectively by means of radical polymerization catalysts, oxygen, organo metal compounds, radiant ray and the like. The alternating copolymers can preferably prepared as in details disclosed in British Pat. No. 1,187,105 and U.S. Pat. No. 3,700,648 in the system containing organoaluminium halides, organoboron halides or the halides similar thereto.

The present invention is based on the discovery that copolymers or multi-component interpolymers prepared from isobutylene or/and propylene and acrylic esters have excellent properties as a fiber treating agent. That is, the treating of various fiber goods with copolymers of the invention impart an anti-pilling, hand-improving, water-proof, water-repellent, shrink-proof, crease-proof, and dimension-stabilizing effects. Furthermore the copolymers are also effectively used as adhesives for textiles such as flocky, unwoven fabrics, bonded fabrics and interlining cloths. Particularly the use of copolymers containing acid halides, acid anhydrides and other functional groups imparts remarkably high durability, e.g., resistance to water, solvent and washing.

Highly reactive functional groups incorporated in fibers are a hydroxyl group in cotton, linen, rayon, vinylon and the like, and an amino or imide group in wool, silk, polyamide fiber, polyurethane fiber and the like. As previously mentioned, the copolymers of the invention are not always brought into a reaction with fibers, and can also be applied to fibers which do not contain functional groups reacting with acid halides in the structure thereof, e.g. glass, polyester, polyacryl or polyolefin fibers, with a remarkably high finishing effect resulting from cross-linking of the copolymers themselves.

One important application of the treating agents of the invention is a shrink-proof finishing of wool. The shrink-proof finishing of wool has previously been tried in various methods of which some have been used in practice, but they have not necessarily been satisfactory. One of those methods most frequently applied is so-called a Scale Masking Process which prevents wool from felting by finishing wool with some polymers, e.g. ethylene-methacryloyl chloride copolymers or polyurethane copolymers. However, this type of finishing using those conventional synthetic copolymers is never satisfactory, because it imparts an unavoidable stiff hand in spite of its improved shrink-proof effect, causes the reduction in durability due to poor resistance to solvents, and causes the problem of stability due to the change of the finishing agents with lapse of time, and other disadvantages.

Moreover, a shrink-proof finishing of wool using agents containing conventional synthetic polymers such as olefin-acid chloride copolymers or polyurethane copolymers mentioned above makes it essential to cure the polymers on the surface of wool under heating and thus causes frequently troubles during curing on a common heated cylinder, resulting in the necessity of a hot water-treatment as disclosed in, for example, U.S. Pat. No. 3,431,132. However, when the novel copolymers of the invention are applied to wool as a shrink-proof treating agent, they impart a soft and durable shrink-proof effect, have a high storage stability and enable a curing at room temperature.

Furthermore, the treating agents of the invention can be applied to knitting goods without deteriorating the characteristics and hand of their own, and can also improve many defects well known to knitting goods, for example, the ease with which pilling occurs and the severe condition of washing due to a poor dimensional stability, resulting in the deterioration of an easy care property, and the difficulty of outwear-use in winter due to a poor anti-air-permeating property. Thus, from the above mentioned, the treating agents of the invention can be said to be useful as an anti-pilling agent, easy care finishing agent, and anti-air-permeating agent for the treatment of knitting goods.

The copolymers of the invention can be applied not only alone but also as auxiliary agents in combination with conventional fiber treating agents now widely employed, thus the effect being further increased. For example, in combination with the treating agents of the invention, silicone water-repellent agents can much increase not only the initial water-repellent effect but also the permanency of the effect.

Fiber treating processes using the fiber treating agents of the invention will now be explained as follows.

The fiber treating agents of the invention display the effect of their own when applied to fibers. The treating agents of the invention can be applied to fibers preferably in the form of solutions thereof in organic solvents or dispersions thereof in media, and can be applied by any of the processes, e.g. impregnating, spraying or coating, employed commonly in the treatment of fiber goods.

Typical examples of solvents for the copolymers of the invention are hydrocarbons such as toluene and xylene; halohydrocarbons such as perchloroethylene, trichloroethylene and methylchloroform; ketones such as methylethylketone; esters such as ethylacetate; ethers such as tetrahydrofuran; nitriles such as acetonitrile; and amides such as dimethylformamides, especially preferably perchloroethylene, and trichloroethylene.

Moreover, the copolymers of the invention can be applied in the form of dispersions, for example, in the form of aqueous dispersions such as suspensions or emulsions.

A typical procedure for the preparation of an aqueous suspension is shown as follows: to a solution of a copolymer of the invention in, e.g. toluene is added a surfactant which is completely dissolved under stirring. A separately prepared aqueous solution in which a dispersion-stabilizing agent and a thickner are dissolved is added to the above solution which is stirred vigorously to prepare an aqueous emulsion. In order to finely atomize the resulting emulsified colloidal particles and (or) to obtain a uniform size distribution thereof, it is very advantageous to use a high-speed stirrer or a high-shear generator, e.g. a dispersator, a linemixer, a high pressure homogenizer, a colloid mill or Gaulin, or to use an emulsifier which makes use of a cavitation effect such as an ultrasonic emulsifier, e.g. a rapisonic homogenizer. Then the solvents and water are partially removed to obtain an aqueous suspension which has a required solid content and a required pH value.

The content of the copolymers of the invention to be used in said solutions or dispersions is 0.1 to 90 percent by weight and usually 1 to 70 percent by weight, especially 3 to 50 percent by weight according to the purpose of application. The add-on of the copolymers to fibers varies according to the purpose of treating, but the formation of monomolecular layer of the copolymer on the surface of fiber remarkably improves the qualities of fibers. The add-on of the copolymers to fibers which is suitable for various applications is 0.1 to 80 percent by weight. More particularly, the add-on is 0.1 to 20 percent by weight, preferably 1 to 10 percent by weight, as a shrink-proof agent for wool goods, which may be loose wool, card sliver or wool yarns. It is preferably about 1.5 to 8 percent by weight as a treating agent for knitting goods, about 30 to 80 percent by weight as a water-proof agent in a coating process, and about 15 to 30 percent by weight as an adhesive for unwoven fabrics. After the treating agents are applied to the fiber goods, the goods are subjected to drying which may be carried out at room temperature or under heating. After drying, a curing process is commonly carried out to fix the copolymers to fibers, however, as mentioned hereinbefore, the treating agents of the invention can be cured at a room temperature and thus make is possible to omit a heat-treating process which was essential in the case of the conventional fiber treating agents. Thus the excellent qualities of the treating agents permit the agents to be applied even to fibers or fiber goods which can not be treated at high temperatures because of poor physical properties and a high deformability of fibers, thus resulting in much advantages in the cost and the process of fiber treatment. Conventional heat-curing at 100° to 140°C displays, of course, the same degree of effect as in a curing at room temperature.

The invention will be illustrated with reference to examples, which are only illustrative but not limitative thereto. Unless otherwise mentioned, all percentages are percentage by weight. The meaning of symbols is as follows.

Pr: propylene
IB: isobutylene
EA: ethyl acrylate
BA: butyl acrylate
EHA: 2-ethylhexyl acrylate
SA: stearyl acrylate
ACL: acryloyl chloride

EXAMPLE 1

A terpolymer is prepared by a direct copolymerization of three components one of which is an acid halide, and dissolved in perchloroethylene to make a treating bath. Wool jersey is impregnated in the bath, squeezed and dried at 80°C for 10 minutes. The shrinking percentage and hand of the finished wool are measured and the results are summarized in the following table. For comparison Zeset TP (a trademark of Du Pon't), which is one of the conventional ethylene-acid chloride copolymers, is employed.

Table 1

Kinds of treating agents

| Sample No. | Copolymers | Composition* (% by mole) |
|---|---|---|
| Zeset TP | — | — |
| 1 | Pr/EHA/ACL | 49/44/7 |
| 2 | Pr/LA/ACL | 48/42/10 |
| 3 | IB/EHA/ACL | 51/42/8 |
| 4 | IB/LA/ACL | 50/44/6 |
| 5 | IB/SA/ACL | 48/38/14 |

Table 2

Qualities of treating agents

Composition of copolymers is the same as in Table 1.

| Sample No. | Add-on (%) | Shrinking percentage (% by area) | Hand (g) |
|---|---|---|---|
| No treatment | — | 48 | 60 |
| Zeset TP | 2.8 | 19 | 159 |
| 1 | 3.2 | 9 | 108 |
| 2 | 2.5 | 10 | 88 |
| 3 | 2.6 | 11 | 93 |
| 4 | 3.3 | 7 | 90 |
| 5 | 2.8 | 8 | 84 |

Procedure

Shrinking percentage test: The tests are carried out according to the Accelerotor Method. Wool goods of 15 $cm \times 15\ cm$ in area is placed in an accelerator which is subsequently charged with 200 ml of 1 percent solution of soap (a major component is sodium carboxylate) at 40°C, and treated at a condition of 1800 rpm ×2 min. Then a shrinking percentage of the treated goods is measured.

Hand test: The tests are carried out at 20 mm of width according to the Handle-O-meter Method. Larger values mean a stiffer hand.

EXAMPLE 2

A treating agent of the invention (Sample No. 3 in Example 1) and Synthapret LKF (a trademark of Bayer), which is one of polyurethane copolymers, for comparison are used, and the change of qualities of finished fabrics against curing conditions with the lapse of time at room temperature is measured.

On finishing, a 2 percent by weight solution of a treating agent mentioned above in perchloroethylene is wet pick up, dried and then cured. Then the shrinking percentage and hand of finished fabrics are measured.

EXAMPLE 3

Three components are directly copolymerized into an acid halide radical-containing terpolymer, which is dissolved in toluene to prepare a 5 percent solution thereof. Acrylic knitting (weight 260 g/m²) is impregnated in the solution, squeezed on mangle, pre-dried at 80°C for 2 minutes and cured at 110°C for 3 minutes. The finished goods show a pleasant stiff-finishing effect, a high pilling-preventing effect and easy care property (dimensional stability). For the purpose of comparison, the same procedures are repeated with Zeset TP (a trademark of Du Pon't, an ethylene-acid chloride copolymer) and a commercial acrylic emulsion containing ethylacrylate as a major component. The results are shown in Table 4.

Table 4

| Treating Agents | | Add-on (%) | Pilling test (grade) | Hand (g) | Easy care property (grade) |
|---|---|---|---|---|---|
| Copolymers | Composition (% by mole) | | | | |
| IB/SA/ACL | 49/41/10 | 5.2 | 5 | 183.0 | 3–4 |
| IB/EA/ACL | 47/44/9 | 5.5 | 5 | 147.5 | 4 |
| Pr/EHA/ACL | 48/40/12 | 4.8 | 4–5 | 162.5 | 3–4 |
| Zeset TP | | 5.6 | 3–4 | 250.5 | 2–3 |
| Acrylic resin | | 5.7 | 3–4 | 188.0 | 2 |
| No treatment | — | — | 2 | 77.5 | 1–2 |

Procedure

Pilling test: A test is carried out on a TO type Pilling Tester under a condition of 1200 $rpm \times 30$ min according to JIS L 1076. Larger values mean a lower degree of occurrence of pilling and consequently excellence.

Hand test: A test is carried out at 20 $mm$ of width according to a Handle-O-Meter Method. Larger values mean a stiffer hand.

Easy Care Property test: A test fabric on which a square of 30 cm in side is marked is placed in a home laundering machine, stirred for 30 minutes under a condition that "Monogen Powder", a detergent, (a product from Daiichi Kogyo Seiyaku Co. Ltd., Japan) is 2.5 g/l, a bath ratio is 1/50 and a temperature is 40°C, rinsed for 10 minutes and tumble dried. An easy care

Table 3

| Sample | Drying and curing conditions | | | Change of qualities of finished fabrics (at room temperature) | | | | | |
|---|---|---|---|---|---|---|---|---|---|
| | Lapse of time (day) | Pre-drying | Curing | Shrinking percentage (%) | | | Hand (g) | | |
| | | | | 1 | 2 | 8 | 1 | 2 | 8 |
| No treatment | — | — | — | 55 | 72 | 56 | 56 | 58 | 57 |
| Synthapret LKF | | 80°C × 3 min | not | 53 | 15 | 12 | 62 | 301 | 307< |
| Sample No. 3 | | drying at room temperature | not | 19 | 13 | 12 | 122 | 120 | 155 |
| do. | | 80°C × 3 min | not | 11 | 9 | 9 | 141 | 148 | 164 |
| do. | | do. | 120°C × 3 min | 14 | 8 | 10 | 130 | 153 | 170 |

Procedure is same as in Example 1.

prepared to make a treating bath, and lamb knitting jersey is impregnated therein, squeezed to 250 percent of property is judged in five grades as follows on the base of appearance of the finished fabrics.

| Grade | Degree of deformation of a square |
|---|---|
| 5 | not deformed |
| 4 | a little |
| 3 | large |
| 2 | very large |
| 1 | completely deformed |

EXAMPLE 4

Acrylic knitting (weight 260 g/m$^2$) is treated, dried and cured in the same way as in Example 3. Then the pilling and hand of finished goods are measured. The results are shown in Table 5 together with the result obtained with Zeset TP (a trademark of Du Pon't) employed for comparison.

Table 5

| Treating agents | | | Drying and curing conditions | | Pilling test (grade) | Hand (g) |
|---|---|---|---|---|---|---|
| Copolymers | Composition (% by mole) | Add-on (%) | Pre-drying | Curing | | |
| IB/EHA/ACL | 48/40/12 | 5.5 | drying at room temperature | not | 4–5 | 115.5 |
| do. | do. | do. | 80°C × 2 min | not | 5 | 128.5 |
| do. | do. | do. | do. | 110°C × 3 min | 5 | 132.0 |
| Zeset TP | | 5.6 | do. | not | 3 | 231.5 |
| No treatment | — | — | — | — | 2 | 77.5 |

Procedure is same as in Example 3.

Table 6

| | Treating baths (composition) | |
|---|---|---|
| Preparation No. | Composition | % |
| A | Sumipel Resin OS-5/Sumitex Accelerator OC-5/a copolymer of the invention | 4/4/1.5 |
| B | Copolymer of the invention alone | 1.5 |
| C | Sumipel Resin OS-5/Sumitex Accelerator OC-5 | 4/4 |

Table 7

| Preparation No. | Treating agents | | Water-repellency | | | |
|---|---|---|---|---|---|---|
| | | | Nylon taffeta | | Tetron taffeta | |
| | Copolymer | Composition (% by mole) | before washing | after washing | before washing | after washing |
| A | IB/SA/ACL | 49/36/15 | 100 | 90–100 | 100 | 90–100 |
| | IB/EA/ACL | 49/41/10 | 100 | 90 | 100 | 90 |
| | Pr/EHA/ACL | 48/37/15 | 100 | 90 | 100 | 90 |
| B | IB/SA/ACL | 49/36/15 | 80–90 | 80 | 80–90 | 80–90 |
| | IB/EA/ACL | 49/41/10 | 70 | 70 | 70–80 | 70 |
| | Pr/EHA/ACL | 48/37/15 | 70–80 | 70 | 80 | 70–80 |
| C | — | — | 100 | 80 | 100 | 80 |

EXAMPLE 5

Three treating baths are prepared as follows, and the compositions thereof are shown in Table 6. Procedure A: 40 g of Sumipel Resin OS-5 (a trademark of Sumitomo Chemical Co. Ltd., Japan), which is a 50 percent solution of methyl hydrogen polysiloxane (a major component) in perchloroethylene, and 40 g of Sumitex Accelerator OC-5 (a trademark of Sumitomo Chemical Co. Ltd., Japan), which is a catalyst for Sumipel Resin OS-5, and 15 g of a copolymer of the invention shown in Table 7 are mixed, and the total is made up to 1 kg with perchloroethylene.

Procedure B: A treating bath is similarly prepared using a copolymer of the invention alone as shown in Table 6.

Procedure C: A treating bath is prepared according to the Procedure A except that copolymers of the invention are not employed.

Test samples, nylon taffeta and tetron taffeta, are each impregnated in a treating bath, squeezed to 35 percent of pick up with nylon taffeta and to 30 percent of pick up with tetron taffeta, pre-dried at 80°C for 2 minutes, cured at 130°C for 3 minutes and aged for 24 hours at a room temperature. Then the water-repellency of the finished fabrics is measured. The results are shown in Table 7.

Procedure

Water-repellency test: A test is carried out by a Spray Method according to JIS L 1079.

Washing condition: A test is carried out on a commercial home laundering machine under a condition that "Monogen Power", a detergent, (a trademark of Daiichi Kogyo Seiyaku Co. Ltd., Japan) is 2.5 g/l, a bath ratio is 1 : 50, a temperature is 40°C, a time is 50 minutes and rinsing is 20 minutes.

EXAMPLE 6

30 g of Sumipel Resin SE conc. (a trademark of Sumitomo Chemical Co. Ltd., Japan), which is a 60 percent emulsion of methyl hydrogen polysiloxane (a major component), 20 g of Sumitex Accelerator SX-70A (a trademark of Sumitomo Chemical Co. Ltd., Japan), which is a catalyst for Sumipel Resin SE conc. and 30 g of a 50 percent by weight aqueous suspension of the copolymer of the invention shown in Table 9 are mixed, and the total is made up to 1 kg with water to prepare a treating bath (Procedure A). 40's cotton broad is impregnated in the bath, squeezed on mangle to 65 percent of wet pick-up, pre-dried at 80°C for 2 minutes, cured at 130°C for 3 minutes and aged at a room temperature for 24 hours. Then the water-repellency of the finished fabrics is measured. The water-repellency similarly obtained with a treating bath described in Table 8 is measured and all the results are shown in Table 9.

Table 8

Treating baths (composition)

| Preparation No. | Composition | % |
|---|---|---|
| A | Sumipel Resin SE conc./Sumitex Accelerator SX-70A/50% by weight aqueous suspension of a copolymer of the invention | 3/2/3 |
| B | 50% by weight aqueous suspension of a copolymer of the invention alone | 3 |
| C | Sumipel Resin SE conc./Sumitex Accelerator | 3/2 |

Table 9

| Preparation No. | Treating agents Copolymer | Composition (% by mole) | Water-repellency Before washing | After washing |
|---|---|---|---|---|
| A | IB/SA/ACL | 49/46/5 | 100 | 80–90 |
|   | IB/EHA/ACL | 48/46/6 | 100 | 80–90 |
| B | IB/SA/ACL | 49/46/5 | 70 | 70 |
|   | IB/EHA/ACL | 48/46/6 | 50–70 | 50–70 |
| C | — | — | 100 | 80 |

EXAMPLE 7

40 percent solutions of copolymers of the invention in toluene are prepared as shown in Table 10. The viscosity thereof is 15,000 to 20,000 cps. Canvas made of polyamide fiber is applied with the solution, dried at 80°C for 10 minutes, cured at 110°C for 5 minutes and aged at a room temperature for 24 hours. The resistance to hydrostatic pressure, air-permeability and water-repellency of the finished fabrics are measured. A comparison between the result obtained with the copolymers of the invention and the result with a commercial acrylic emulsion containing ethyl acrylate as a major component (which is thickened by an aqueous ammonia) is shown in Table 10.

Washing condition: A test is carried out on a commercial home laundering machine under a condition that "Monogen Powder", a detergent, is 2.5 g/l, a bath ratio is 1/50, a temperature is 40°C, a time is 20 minutes and rinsing is 20 minutes.

EXAMPLE 8

45 percent solutions of copolymers of the invention in toluene are prepared as shown in Table 11. The viscosity thereof is 30,000 to 35,000 cps. Polyester knitting (weight 250 g/m$^2$) and nylon shirr crepe (weight 27 g/m$^2$) are spot-welded by a roller printing process with the solution so that an add-on of the resin is 70 g/m$^2$ (a pressure between rollers is 0.5 kg/cm$^2$), dried at 80°C for 5 minutes, and cured at 130°C for 3 minutes. Then the peel strength of the finished fabrics is measured. As a control, is employed Zeset TP (a trademark of Du Pon't) which is an ethylene-acid chloride containing copolymer.

Table 11

| Treating agent Copolymer | Composition (% by mole) | Peel strength (g/2.5 cm) Initial | After impregnating in perchloroethylene |
|---|---|---|---|
| IB/EA/ACL | 48/43/9 | 1,180 | 510 |
| IB/EHA/ACL | 49/41/10 | 1,330 | 760 |
| Pr/EHA/ACL | 48/43/9 | 980 | 420 |
| Zeset TP |   | 650 | 120 |

Procedure
Resistance to solvent: A test is carried out by a Perchloroethylene Process according to JIS L 1089, wherein a solution temperature is 20°±2°C and an impregnating time is 15 minutes.
Peel strength test: A test is carried out on an Instron type tensile strength tester and a tensile velocity is 10 cm/min.

EXAMPLE 9

10 percent solutions of copolymers of the invention in toluene are prepared as shown in Table 12. About 40

Table 10

| Treating agent Copolymer | Composition (% by mole) | Add-on of resin (%) | Resistance to hydrostatic pressure (cm. H$_2$O) Before washing | After washing | Water-repellency Before washing | After washing | Air-permeability (ml/15 sec) |
|---|---|---|---|---|---|---|---|
| IB/EHA/ACL | 48/36/16 | 60 | 100 | 70 | 90–100 | 90 | 30 |
| IB/SA/ACL | 50/40/10 | 55 | 80 | 60 | 100 | 90–100 | 45 |
| IB/EA/ACL | 50/35/15 | 55 | 95 | 64 | 90–100 | 90 | 33 |
| Control |   | 70 | 70 | 50 | 50 | 50 | 41 |

Procedure
Test of resistance to hydrostatic pressure: A test is carried out on a Schopper type hydrostatic pressure tester by a Hydrostatic Pressure Method according to JIS L 1079.
Water-repellency test: By a Spray Method according to JIS L 1079
Air-permeability test: A test is carried out on a Emiel Greiner's porositymeter according to JIS C 2111.

g/m$^2$ of web made of 100 percent of polyester fiber is impregnated therein, squeezed on mangle to 20 percent of dry pick up, pre-dried at 80°C for 5 minutes, and cured at 130°C for 3 minutes. The unwoven fabric thus obtained is bulky and has a good hand. The qualities of the fabric is compared, as shown in Table 12, with that of conventional unwoven fabric treated with a commercial acrylic emulsion containing ethyl acrylate as a major component.

Table 12

| Treating agent | | Tensile strength | | | |
|---|---|---|---|---|---|
| | | Warp direction | | Filling direction | |
| Copolymer | Composition (% by mole) | Initial (KGSC value) | After impregnating in perchloroethylene (KGSC value) | Initial (KGSC value) | After impregnating in perchloroethylene (KGSC value) |
| IB/EHA/ACL | 50/40/10 | 42.9 | 25.7 | 9.3 | 5.6 |
| IB/EA/ACL | 45/45/10 | 42.7 | 24.8 | 8.9 | 5.3 |
| Control | | 38.8 | 16.5 | 7.7 | 3.8 |

Procedure

Tensile strength test: A test is carried out on an Instron type tensile strength tester according to JIS L 1085.

KGSC value = tensile strength (kg/cm)/weight (g/cm$^2$)

The Perchloroethylene Impregnation Method is carried out according to JIS L 1089, wherein a solution temperature is 20°±2°C and an impregnating time is 15 minutes.

EXAMPLE 10

Three components, that is, isobutylene (IB), 2-ethylhexylacrylate (EHA) and maleic anhydride (MAn), are directly copolymerized into a terpolymer which has a composition of LB/EHA/MAn = 49/44/7 (% by mol). The terpolymer is dissolved in perchloroethylene to prepare a treating bath and wool jersey is impregnated therein, squeezed, and dried at 80°C for 10 minutes. The shrinking percentage and hand of the finished wool jersey are measured and shown in Table 13 in which a high shrink-proof effect is observed.

Table 13

| Sample No. | Add-on (%) | Shrinking percentage (% by area) | Hand (g) |
|---|---|---|---|
| No treatment | — | 48 | 60 |
| 1 | 2.8 | 12 | 101 |
| 2 | 3.3 | 8 | 93 |

Procedure is same as in Example 1.

Table 14

| Treating agents | | Add-on (%) | Pilling test (grade) | Hand (g) | Easy care property (grade) |
|---|---|---|---|---|---|
| Copolymer | Composition (% by mol) | | | | |
| Pr/SA/N-butyl-acrylamide | 50/46/4 | 5.1 | 5 | 178 | 3–4 |
| No treatment | — | — | 2 | 77.5 | 1–2 |

Procedure is same as in Example 3.

EXAMPLE 12

40 percent solutions of copolymers of the invention in toluene are prepared as shown in Table 15. The viscosity thereof is 15,000 to 20,000 cps. Canvas made of polyamide fiber is applied with the solution, dried at 80°C for 10 minutes, cured at 110°C for 5 minutes and aged at a room temperature for 24 hours. The resistance to hydrostatic pressure, air-permeability and water-repellency of the finished fabrics are measured. A comparison between the result obtained with the copolymers of the invention and the result with a commercial acrylic emulsion containing ethylacrylate as a major component (which is thickened by an aqueous ammonia) is shown in Table 15.

Table 15

| Treating agent | | Add-on of resin (%) | Resistance to hydrostatic pressure (cm H$_2$O) | | Water-repellency | | Air-permeability (ml/15 sec) |
|---|---|---|---|---|---|---|---|
| Copolymer | Composition (% by mole) | | Before washing | After washing | Before washing | After washing | |
| IB/BA | 50/50 | 55 | 80 | 65 | 100 | 90–100 | 43 |
| Control | — | 70 | 70 | 50 | 50 | 50 | 41 |

Procedure is same as in Example 7.

EXAMPLE 11

A terpolymer which has a composition of Pr/SA/N-butylacrylamide is dissolved in toluene to prepare a 5 percent solution thereof. Acrylic knitting (weight 260 g/m$^2$) is impregnated in the solution, squeezed on mangle, pre-dried at 80°C for 2 minutes and cured at 110°C for 3 minutes. The finished goods show a pleasant stiff-finishing effect, a high pilling-preventing effect and easy care property (dimensional stability).

EXAMPLE 13

Ten percent solutions of copolymers of the invention in toluene are prepared as shown in Table 16. About 40 g/m$^2$ of web made of 100 percent of polyester fiber is impregnated therein, squeezed on mangle to 20 percent of dry pick up, pre-dried at 80°C for 5 minutes, and cured at 130°C for 3 minutes. The unwoven fabric thus obtained is bulky and has a good hand. The qualities of the fabric is compared, as shown in Table 16, with that of conventional unwoven fabric treated with a commercial acrylic emulsion containing ethyl acrylate as a major component.

Table 16

| Treating agent | | Tensile strength | | | |
| --- | --- | --- | --- | --- | --- |
| | | Warp direction | | Filling direction | |
| Copolymer | Composition (% by mole) | Initial (KGSC value) | After impregnating in perchloroethylene (KGSC value) | Initial (KGSC value) | After impregnating in perchloroethylene (KGSC value) |
| Pr/EHA/acrylic acid | 48/40/12 | 42.1 | 23.7 | 9.3 | 5.8 |
| IB/BA/acrylic amide | 50/45/5 | 43.1 | 26.9 | 9.5 | 7.1 |
| Control | | 38.8 | 16.5 | 7.7 | 3.8 |

Procedure is same as in Example 9.

What is claimed is:

1. A fiber treating composition containing copolymers of: (A) about 30 to 50 percent by mole of at least one member selected from the group consisting of isobutylene and propylene, (B) about 20 to 70 percent by mole of at least one acrylic ester in which the alcohol moiety is a hydrocarbon residue having one to 20 carbon atoms, and (C) about 0 to 30 percent by mole of at least one functional vinyl compound having three to 40 carbon atoms, said functional vinyl compound including a functional group selected from the group consisting of: acid halide, amide, carboxyl, acid anhydride, nitrogen-containing heterocylic, nitrile and aldehyde groups.

2. A fiber treating composition according to claim 1, wherein the content of the functional vinyl compounds is 0.1 to 30 percent by mole.

3. A fiber treating composition containing copolymers of: (A) about 30 to 50 percent by mole of at least one member selected from the group consisting of isobutylene and propylene, and (B) about 50 to 70 percent by mole of at least one acrylic ester in which the alcohol moiety is a hydrocarbon residue having one to 20 carbon atoms.

4. A fiber treating composition according to claim 3, wherein the copolymer consists essentially of: about 50 percent by mole of the (A) component, and about 50 percent by mole of the (B) component.

5. A fiber treating composition according to claim 1, wherein the functional vinyl compound is a compound having a general formula selected from the group consisting of:

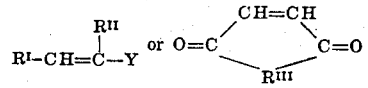

wherein Y is a residue having a functional group selected from the group consisting of: acid halide, amide, carboxyl, acid anhydride, nitrogen-containing heterocyclic, nitrile and aldehyde groups, and having one to 20 carbon atoms; $R^I$ and $R^{II}$ are each a hydrogen or a hydrocarbon group having one to eight carbon atoms or a residue selected from Y; and $R^{III}$ is an oxygen atom or N-$R^{IV}$ group wherein $R^{IV}$ is a hydrogen atom or a hydrocarbon residue having one to eight carbon atoms.

6. A fiber treating composition according to claim 1, wherein the functional vinyl compounds are selected from the group consisting of acryloyl halides, acrylic acid, acrylamides, maleic anhydride, maleimides, fumaric acid, and maleic acid.

7. A process for treating fibers, characterized in that the fibers are treated with the copolymers defined in claim 1.

8. A process for treating fibers, which comprises applying a solution or dispersion of the copolymer of claim 1 to fibers in an amount of 0.1 to 80 percent by weight, and then removing the solvent or dispersion medium to fix the copolymer to said fibers.

9. The process according to claim 8, wherein the fiber is selected from the group consisting of wool, silk, polyamide, polyurethane, vinylon, glass fiber, polyester, polyacrylonitrile, polyolefin and linen fibers.

* * * * *